United States Patent
Eppolito

(10) Patent No.: US 8,131,100 B2
(45) Date of Patent: Mar. 6, 2012

(54) REPRESENTING HIGH-RESOLUTION MEDIA CONTENT IN A LOWER RESOLUTION SYSTEM

(75) Inventor: Aaron Eppolito, Santa Cruz, CA (US)

(73) Assignee: Apple Inc., Cupertino, CA (US)

(*) Notice: Subject to any disclaimer, the term of this patent is extended or adjusted under 35 U.S.C. 154(b) by 1181 days.

(21) Appl. No.: 11/974,353

(22) Filed: Oct. 11, 2007

(65) Prior Publication Data

US 2009/0097770 A1 Apr. 16, 2009

(51) Int. Cl.
 *G06K 9/42* (2006.01)
 *G06K 9/44* (2006.01)
 *H04N 7/00* (2006.01)
 *H04N 11/00* (2006.01)

(52) U.S. Cl. ........................................ 382/256; 348/464

(58) Field of Classification Search .................. 382/256; 370/503, 508, 509, 512, 516, 518, 514; 348/423, 348/464
See application file for complete search history.

(56) References Cited

U.S. PATENT DOCUMENTS

| | | | | |
|---|---|---|---|---|
| 5,598,352 A * | 1/1997 | Rosenau et al. | ............... | 715/203 |
| 6,041,067 A * | 3/2000 | Takamori et al. | ............. | 370/514 |
| 6,373,529 B1 * | 4/2002 | Brett | ............................ | 348/571 |
| 6,512,884 B1 * | 1/2003 | Sawada | ........................ | 386/203 |
| 7,461,002 B2 * | 12/2008 | Crockett et al. | ............. | 704/278 |
| 2005/0042591 A1 * | 2/2005 | Bloom et al. | ............. | 434/307 A |
| 2005/0114754 A1 * | 5/2005 | Miller et al. | ............... | 715/500.1 |
| 2007/0118873 A1 * | 5/2007 | Houh et al. | .................. | 725/136 |
| 2009/0087161 A1 * | 4/2009 | Roberts et al. | ................. | 386/66 |

* cited by examiner

*Primary Examiner* — Andrae S Allison
(74) *Attorney, Agent, or Firm* — Van Pelt, Yi & James LLP

(57) ABSTRACT

Representing high-resolution media content in a lower resolution system is disclosed. For a first portion of a high-resolution media content which is associated with a content boundary that does not align with an interval boundary of the lower resolution system, a new media content file that includes at least said first portion of the high-resolution media content is created. The new media content file and a second file comprising at least a second portion of the original media content file, which second portion begins at a first interval boundary and ends at a second interval boundary of the lower resolution system, are provided to the lower resolution system.

20 Claims, 9 Drawing Sheets

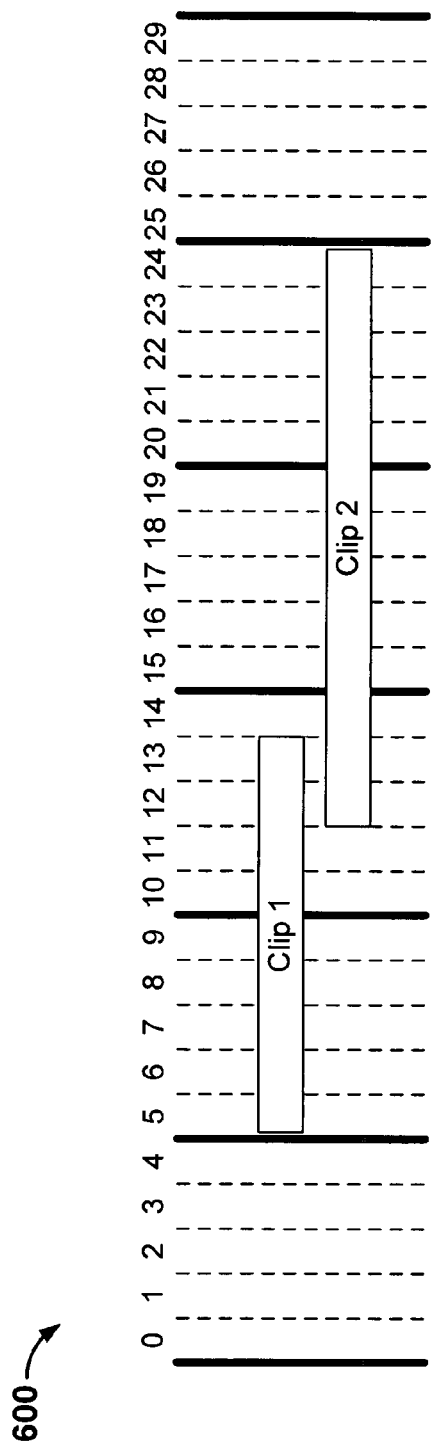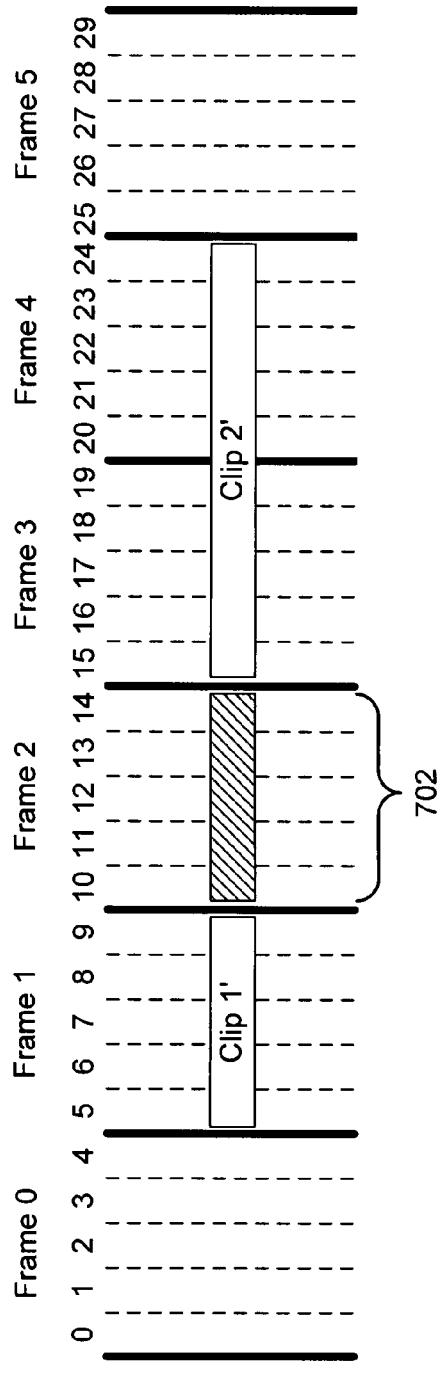
FIG. 7A
FIG. 7B

REPRESENTING HIGH-RESOLUTION MEDIA CONTENT IN A LOWER RESOLUTION SYSTEM

BACKGROUND OF THE INVENTION

Software applications and/or hardware systems have been provided to enable audio, video, and other media content to be edited, manipulated, enhanced, modified, mixed, and arranged to provide a desired media output. For example, such applications/systems may be used to combine and sequence selected portions of video, audio, animation, and/or other media content files—sometimes referred to herein as "clips"—to provide a desired output. Examples of such applications include without limitation Soundtrack® Pro ("STP") and Final Cut Pro® ("FCP") available from Apple Inc.

FIG. 1 shows an example of a media editing/mixing interface 100. In the example shown, media clips denoted "Clip 1", "Clip 2", "Clip 3", and "Clip 4" have been arranged along a time or other sequence line indicated by the numbers "0" to "29", with the start and stop of each numbered interval being indicated by a vertical dashed line. In the example shown, Clip 1 and Clip 3 would begin being rendered at the start of interval "3"; Clip 2 would begin being rendered at the start of interval "7"; , Clip 3 would end at the end of interval "15"; Clip 4 would start at the beginning of interval 18; Clip 2 would end at the end of interval "18"; Clip 1 would end at the end of interval "25"; and finally Clip 4 would end at the end of interval "26". The Clips 1-4 may comprise any media content. For example, Clip 1 might be video content, and Clips 2, 3, and 4 audio desired to be rendered with corresponding portions of video content in Clip 1.

Some media editing/design applications have a higher resolution, i.e., the ability to place a clip at finer gradations along a time or other sequence line, than other such applications. For example, an application focused primarily on audio content, such as STP, may provide the ability to specify start/stop times to a precision of some small fraction of a second (e.g., a 64 bit floating point value in the case of STP), while a video application such as FCP may only support starting/stopping a clip at an indicated frame number or index, typically at a relatively more course granularity, such as 24-30 frames per second (i.e., timeline gradations of ⅟30-⅟24 seconds). In some cases, it may be desirable or necessary to represent in a lower resolution application and/or system media content and/or a project created in a higher resolution system, for example to enable an audio track or mix created in STP to be combined in FCP with video edited and/or arranged in FCP to create a combined multi-media project and/or output. However, the start/stop boundaries of clips as arranged in the higher resolution system, for example at a granularity of some small fraction of a second, may not line up neatly with the gradations of the lower resolution system.

FIG. 2 illustrates the potential misalignment of start/stop boundaries when higher resolution media content is represented in a lower-resolution application or system. As used herein the terms "higher resolution system" and "lower resolution system" include without limitation media editing and/or design software and/or hardware and/or combinations thereof. Note that in this sense the higher and lower resolution "systems" may reside in the same physical computer, such as would be the case if each were an application running on the same machine. In the example shown in FIG. 2, a first clip 202 and a second clip 204 have been arranged in a media editing interface 200 of a first, higher resolution application, associated in FIG. 2 with the lower time or sequence line indicated by the numbers "0" through "29". The clips are desired to be represented in a second, lower-resolution system, represented in FIG. 2 by the upper, lower-resolution frame indexes/numbers ("Frame 0" through "Frame 5") and the corresponding thick (non-dashed) vertical lines. In this example, there are an even five intervals of the higher resolution system for each interval (i.e., frame) of the lower resolution system. However, in many cases there will not be such an even ratio. As the example shown in FIG. 2 illustrates, the higher resolution content must be represented in the lower resolution system in a manner that enables the lower resolution system to render the content in a manner that (at least most nearly) matches the designer's intent and is within the capabilities of the lower resolution system. In this example, the lower resolution system can only start or stop clips at frame boundaries, and cannot directly render the clips 202 and 204 as arranged in the higher resolution system, because that would require clip 202 to start in the middle of Frame 0, for example. In the example shown in FIG. 2, clip 202 comprises a portion of an underlying media file 206 that includes other content not included in clip 202, as will be discussed further below.

FIGS. 3A-3C illustrate prior art techniques for representing higher resolution media content in a lower resolution system. In FIG. 3A, the clips 202 and 204 have been shifted and truncated to provide shifted clips 322 and 324; but this approach results in the clips starting and stopping later/earlier than the designer intended, potentially resulting in their being out of synch with other/related content. Also, in this example the end of each of clips 202 and 204 (portions "23-25" and "Q-S", respectively) has been lost. In the approach shown in FIG. 3B, clip 202 of FIG. 2 has been truncated at each end to create a truncated clip 332, which starts and stops on the lower resolution frame boundaries. Likewise, clip 204 has been truncated to create a truncated clip 334 that aligns with the frame boundaries of the lower-resolution system. In this approach, the portions included are rendered at the time originally desired but the truncation results in parts of the media content—in this example portions "13" and "14" at the beginning of clip 202 and portion "25" at the end, as well as portions "G-I" at the beginning of clip 204, being lost (i.e., not represented and therefore not rendered) in the lower-resolution system. Finally, in the approach shown in FIG. 3C, content comprising clips arranged in a higher resolution system is incorporated into one or more clips expanded in length at the beginning and/or end, as required, for example by adding silence or other null content, to create one or more expanded clips that begin and end on frame (or other lower resolution system) boundaries, such as the expanded clip 342 of FIG. 3C. The approach shown in FIG. 3C, however, may limit flexibility, e.g., the ability to further edit or manipulate clips in the destination (lower-resolution) system. Typically a clip such as clip 202 comprises a view or other representation and/or designation of a selected portion of an underlying media content file, such as an audio or video content file, for example the media file 206 shown in FIG. 2. By way of example, the clip 202 may include a selected scene or other portion of an audio or video file that include other content before or after the portion included in the clip. The lower resolution system may allow a clip to be modified (or a new clip defined) to include such additional portions, e.g., by moving the clip start boundary to the left or the clip end boundary to the right, but such flexibility to further edit would not be available if only a static combined and expanded clip such as clip 342 were provided to the lower-resolution system.

BRIEF DESCRIPTION OF THE DRAWINGS

Various embodiments of the invention are disclosed in the following detailed description and the accompanying drawings.

FIGS. 7A and 7B illustrate an embodiment of representing in a destination system cross-fade and/or other effects created in a source system.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Representing high-resolution media content in a lower resolution system is disclosed. In some embodiments, one or more "loose end" and/or intersection files having boundaries aligned with time or other sequence line increments of a lower resolution system are combined with a truncated clip of one or more original media files to provide a set of two or more adjacent clips, each of which starts and stops at the beginning/end of an interval of the lower resolution system and which together include all of the originally selected and desired media content with each selected portion being rendered at a time/point as indicated in the higher resolution system.

Figure 1:
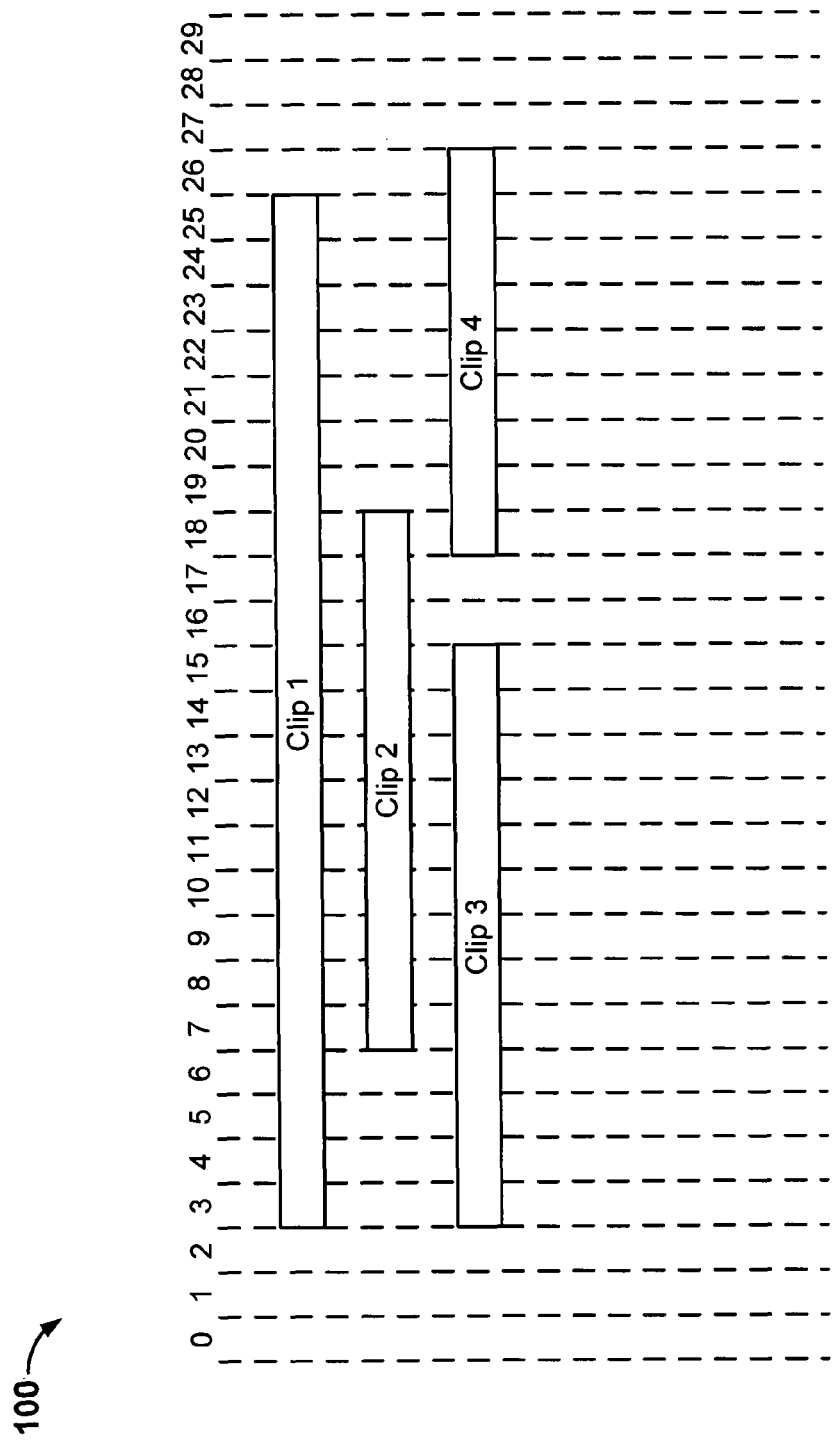
FIG. 1 shows an example of a media editing/mixing interface 100. In the example shown, media clips denoted "Clip 1", "Clip 2", "Clip 3", and "Clip 4" have been arranged along a time or other sequence line indicated by the numbers "0" to "29", with the start and stop of each numbered interval being indicated by a vertical dashed line.
Figure 2:
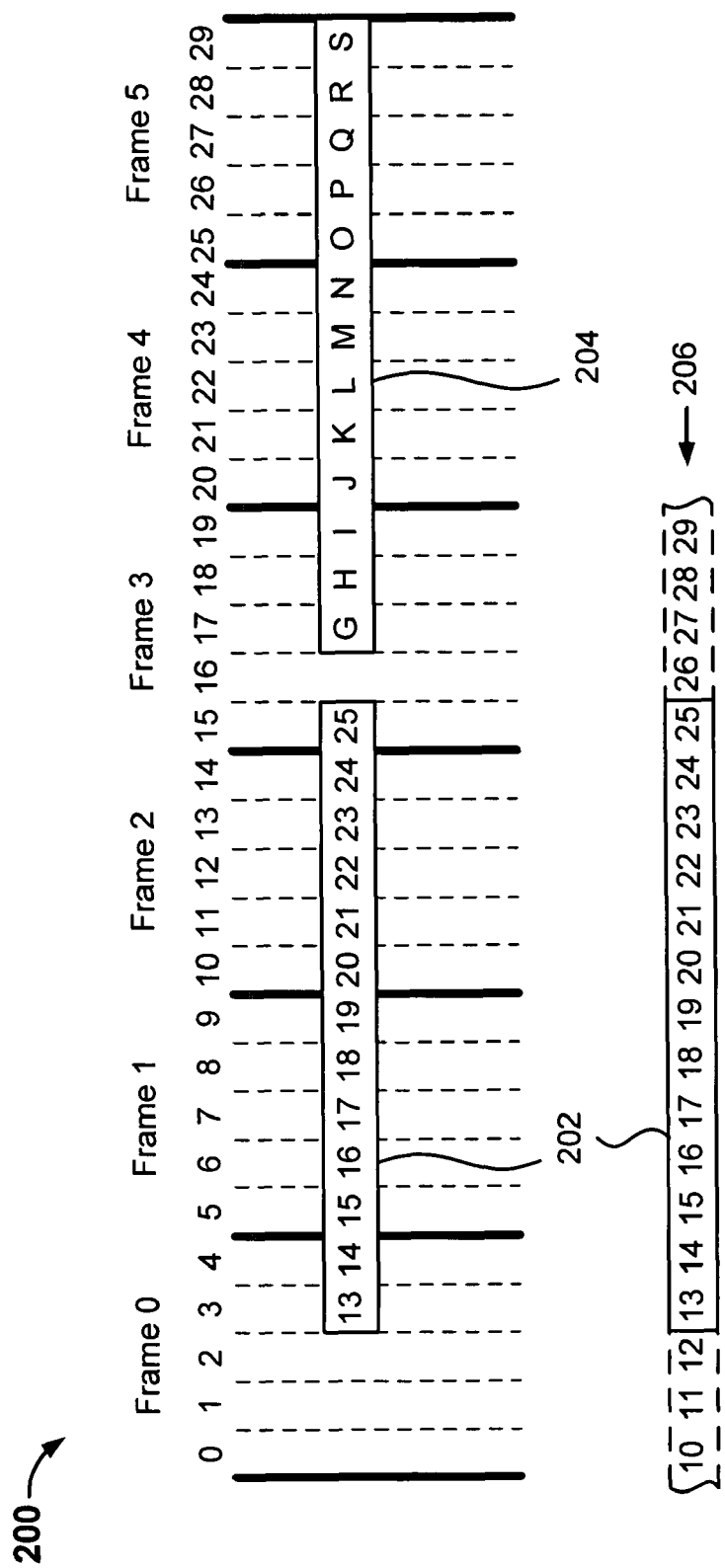
FIG. 2 illustrates the potential misalignment of start/stop boundaries when higher resolution media content is represented in a lower-resolution application or system.
Figure 3A:
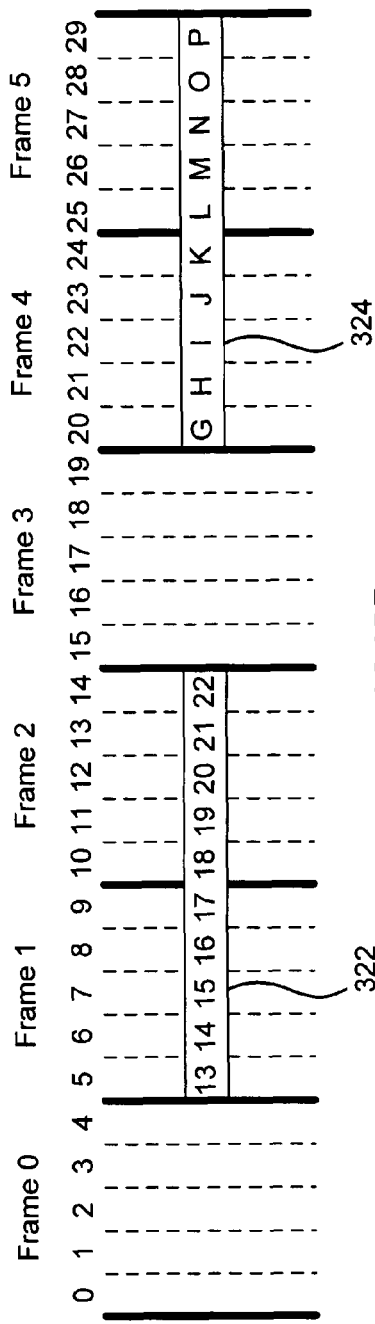
FIGS. 3A-3C illustrate prior art techniques for representing higher resolution media content in a lower resolution system.
Figure 3B:
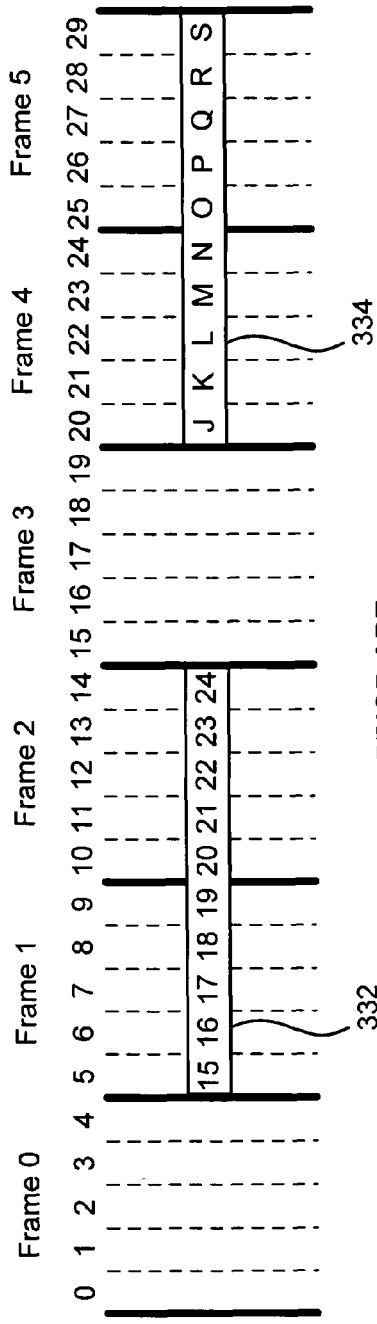
Figure 3C:
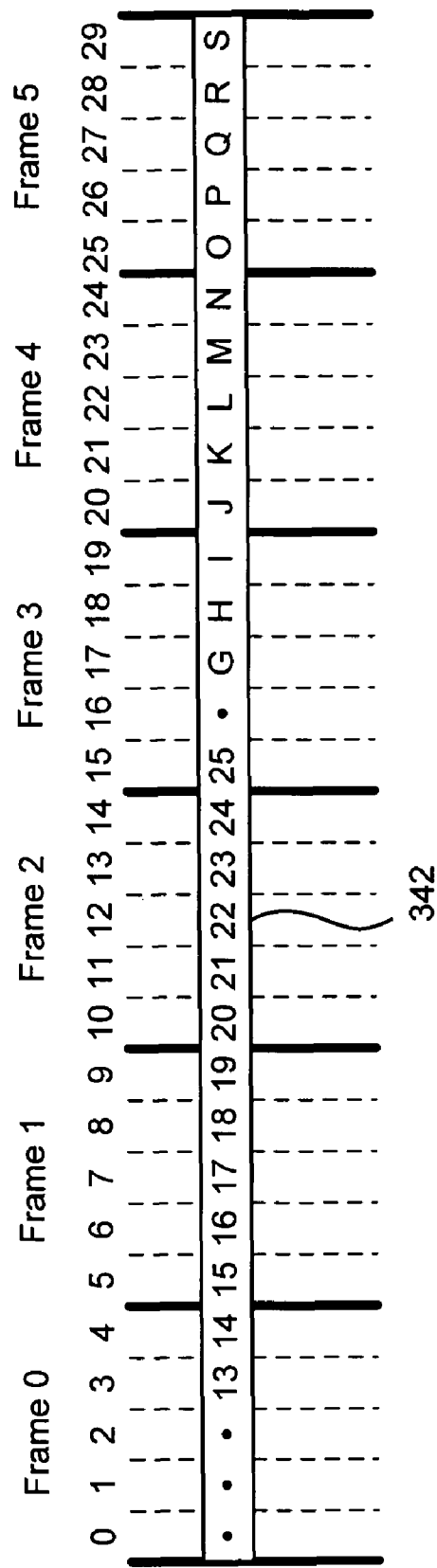
Figure 4A:
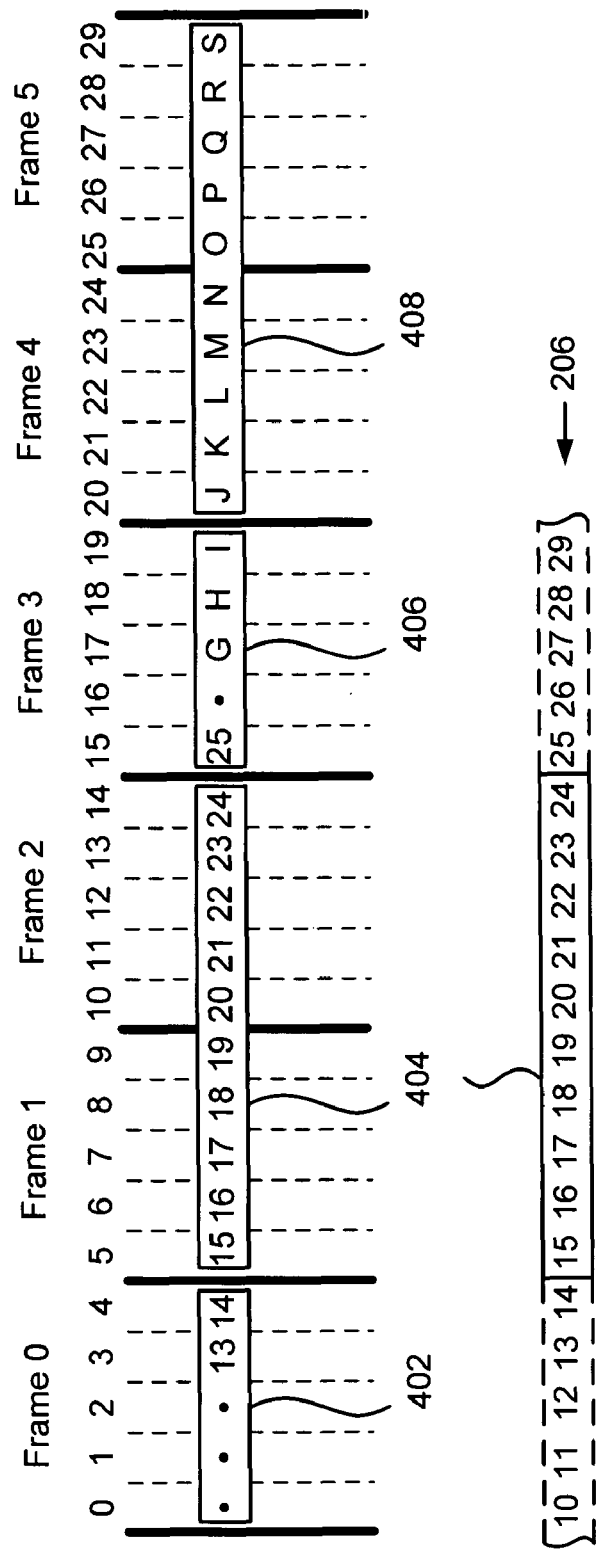
FIG. 4A illustrates an embodiment of a technique for representing high-resolution media content in a lower resolution system.

FIG. 4A illustrates an embodiment of a technique for representing high-resolution media content in a lower resolution system. In the example shown, the clips 202 and 204 of FIG. 2 are represented in the lower resolution system (associated with the frames 0 through 5 of FIG. 4A) by clips 402, 404, 406, and 408. In some embodiments, each of clips 402-408 is associated with a corresponding file. For example, clip 404 is formed by generating a shortened clip, aligned with the frame (or other) boundaries of the lower resolution system, based in this example on the original media file 206 on which clip 202 is based. Likewise, clip 408 is a shortened clip based on the same underlying media file as clip 204. In addition to the shortened clips 404 and 408 and the underlying original media files, a "loose end" clip 402 and an "intersection" clip 406, as associated files, are created. In some embodiments, clips 402 and 406, and associated underlying files, are generated programmatically, for example by a higher resolution system, in response to receiving an indication that high resolution media content, such as clips 202 and 204, is to be represented (e.g., exported to) a lower resolution system. In the example shown, loose end clip 402 includes a silence, filler, or other null content portion (represented in FIG. 4 by the large dots at the beginning of clip 402), which starts at the beginning of the lower resolution boundary immediately preceding the start time/location of original clip 202, in this case Frame 0, and ends at the first lower resolution (frame) boundary crossed by the original clip 202, in this case the beginning of Frame 1. Those portions of clip 202 that were truncated from the beginning of clip 202 to create clip 404 are included in the loose end clip 402 at a point such that they will be rendered in the lower resolution system, as part of clip 402, beginning at a point in (absolute and/or relative) time corresponding to the placement of clip 202 in the higher resolution system. In some embodiments, clip 402 is associated with an underlying loose end file, not shown, that includes at least the media content included in clip 402. In some embodiments, the underlying loose end file includes additional content, for example at least an additional portion of the content file 206 on which the original clip 202 was based, such as portions "15" through "19" or some other additional portion(s), to enable the loose end clip to be edited and/or otherwise manipulated to at least some extent in the destination (lower resolution) system. The intersection clip 406 includes in this example the portion removed from the end of clip 202 to create clip 404, i.e., portion "25", a null content portion (large dot), and the portions of clip 204 removed from the beginning of clip 204 to create clip 408, i.e., portions "G", "H", and "I" in this example. As with loose end clip 402, intersection clip 406 in some embodiments is based on and/or otherwise associated with an underlying file created by combining the included portions of clips 202 and 204 with null content. As with the file underlying loose end clip 402, in some embodiments the file underlying intersection clip 406 includes additional adjacent portions of clip 202 (e.g., portions "20" through "24") and/or clip 204 (e.g., portions "G" through "I") to enable at least limited editing and/or other manipulation of the intersection clip in the destination (lower resolution) system.

In some embodiments, a shortened clip such as clip 404 is based on a media file other than the complete underlying media file on which a corresponding clip in the higher resolution system is based. For example, in some embodiments the clip 404 may be based on a specially-generated media file that includes some but not necessarily all additional portions of the original media file. In the example shown in FIG. 4A, for example, in some embodiments the clip 404 is based on a generated media file that includes just portions "10" through "29" of original media file 206. Using this approach, limited additional content is provided to enable limited editing in the lower resolution system. In some embodiments, the specially-generated file is or may be generated such that the beginning and end boundaries of a clip comprising the entire file would align with corresponding frame (or other) boundaries of the lower resolution system. In the example shown in FIG. 4A, for example, a specially-generated file may include portions "10" through "29" because a clip that included the entire file would align with the beginning of Frame 0 and the end of Frame 5 in the example shown. In some embodiments, silence or other null content may be included at the beginning and/or end of the file to ensure alignment with the boundaries of the lower resolution system. In some embodiments, the original file may be provided, instead of a specially-generated file, in certain circumstances, for example based on a user-configurable preference or in situations in which multiple clips share the same media file. In some embodiments, a specially-generated file is created and provided to the lower resolution system instead of the original media file if the original media file is large and/or large relative to the size of an associated clip. In some embodiments, a specially-generated file with boundaries that align with frame (or other) boundaries of the lower resolution system is provided, instead of the original file, at least in cases where the lower resolution system is not able to use a section of the original media file, if any, that does not begin and/or end on a frame (or other) boundary of the lower resolution system.

Figure 4B:
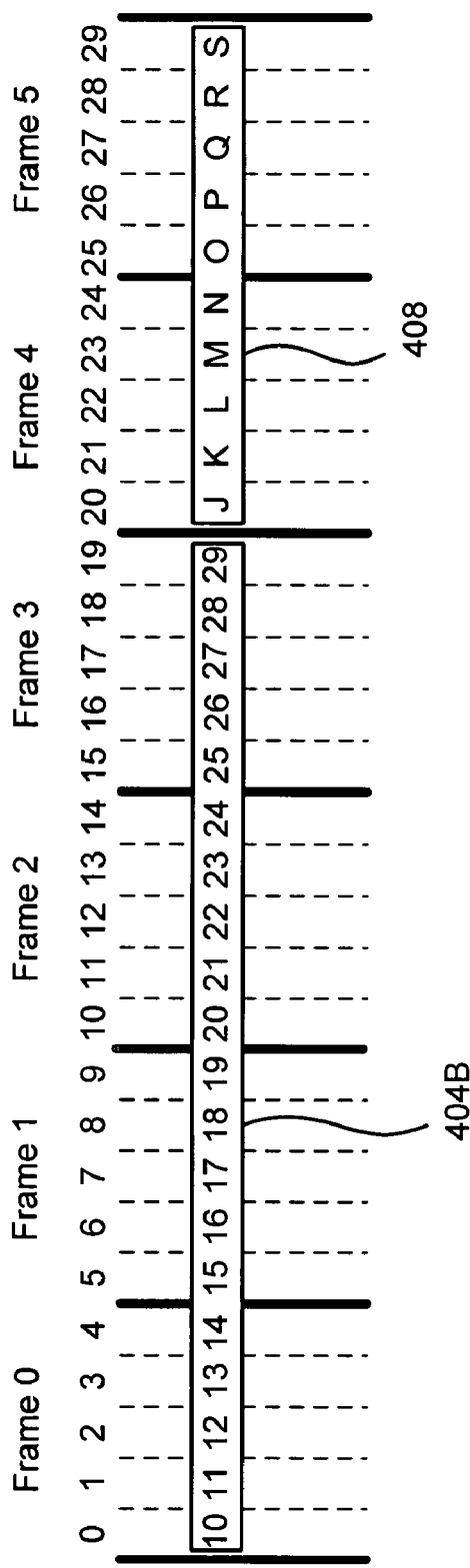
FIG. 4B illustrates an embodiment of a technique for representing high-resolution media content in a lower resolution system.

FIG. 4B illustrates an embodiment of a technique for representing high-resolution media content in a lower resolution system. In the example shown in FIG. 4B, the clip 404 has been expanded to create an expanded clip 404B that begins at the beginning of Frame 0 and ends at the end of Frame 3 and includes items "10" through "29" of the original media file 206. The clip 404B may be based on either a specially-created file that includes just that or possible additional content, or the original media file 206, depending on the embodiment.

Figure 5:
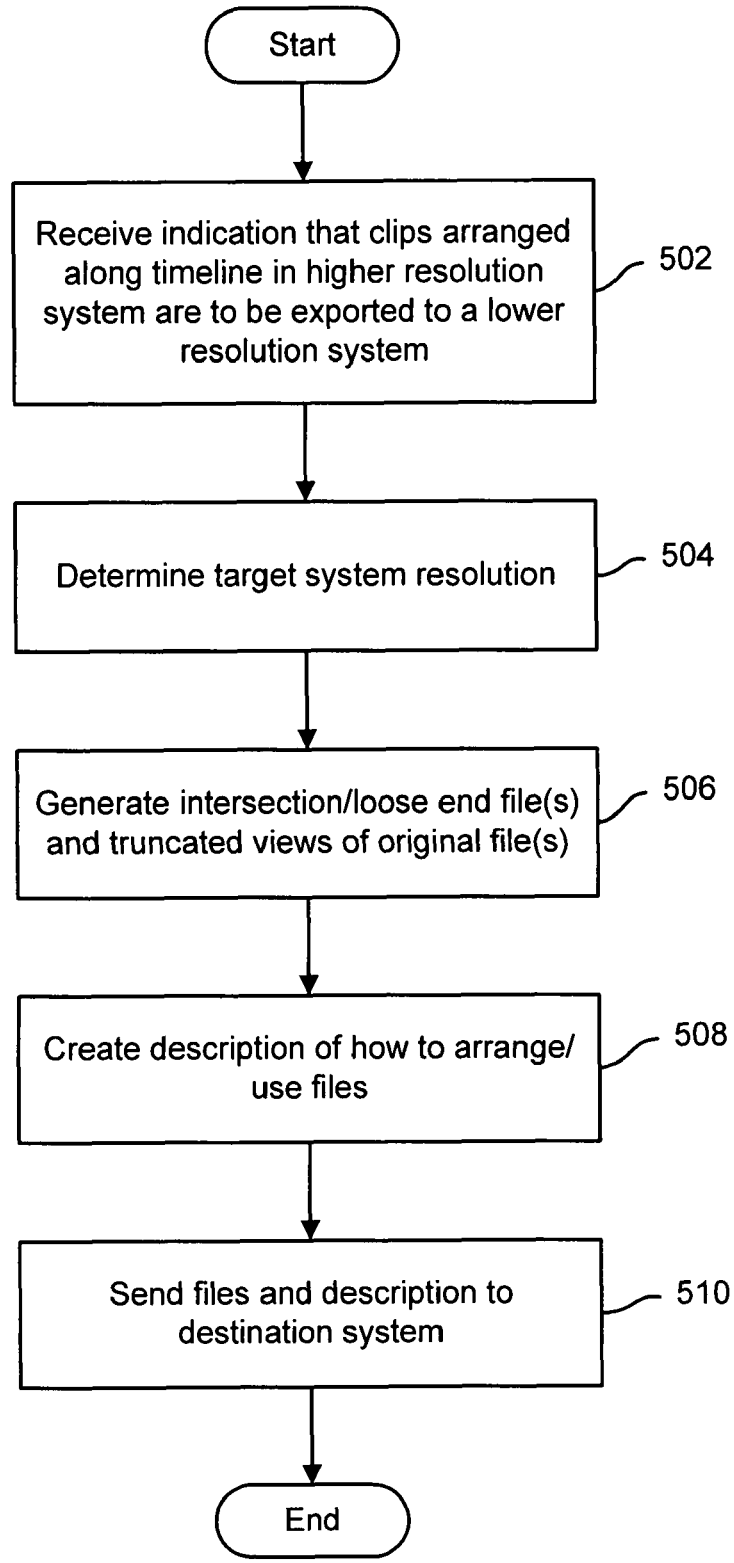
FIG. 5 is a flow chart illustrating an embodiment of a process for representing high-resolution media content in a lower resolution system.

FIG. 5 is a flow chart illustrating an embodiment of a process for representing high-resolution media content in a lower resolution system. In some embodiments, the process of FIG. 5 is used to generate clips such as those shown in FIG. 4. In the example shown, an indication that one or more clips arranged along a timeline (or other sequence line) in a higher resolution system are to be exported to a lower resolution system is received (502). The resolution required and/or supported by the destination system is determined (504). One or more loose end and/or intersection files and/or truncated views of original media files, and/or associated clips, are generated (506). A description of how the files are to be arranged and/or used in the lower resolution system is created (508). The files and description are sent to the lower resolution system (510), after which the process ends.

A benefit of the approach described above in connection with FIGS. 4 and 5 is that the original media content files underlying clips 202 and 204 are provided to the lower resolution system, in connection with clips 404 and 408, which enables full editing and/or other manipulation of the original files, as desired, in the destination system. The approach described herein in some embodiments preserves the intent of the designer in the higher resolution system and enables high resolution media content to be represented in a lower resolution system without loss of content, flexibility, and/or synchronization.

Figure 6A:
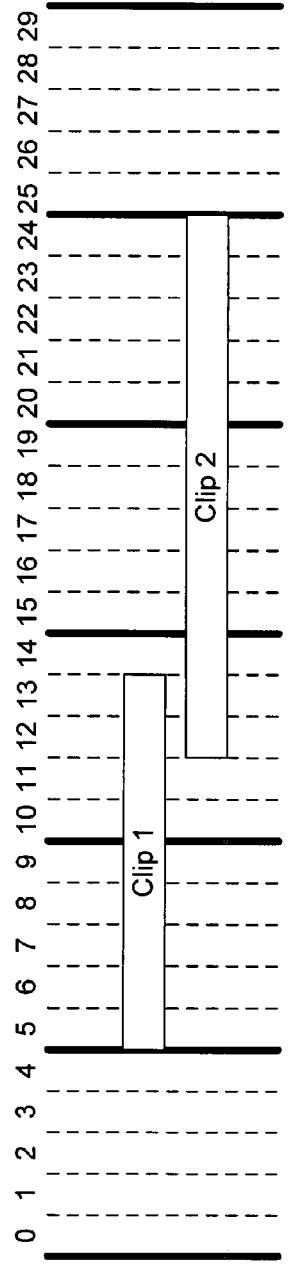
FIGS. 6A and 6B illustrate a prior art approach to exporting to a destination system an effect, such as cross-fade, from a system in which the effect was created.
Figure 6B:
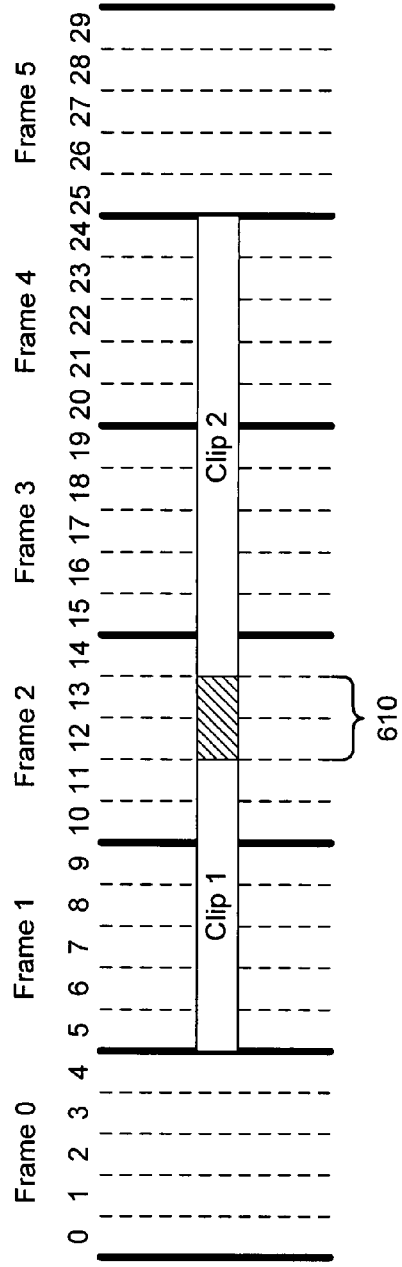

In some embodiments, the approach disclosed herein is used to represent in a destination system a cross-fade and/or other effect created in a source system. FIGS. 6A and 6B illustrate a prior art approach to exporting to a destination system an effect, such as cross-fade, from a system in which the effect was created. In the example shown, a "cross-fade" effect is created in a source system (e.g., editing interface 600) by causing a first clip (Clip 1) to fade out while a second clip (Clip 2) fades in. In a prior art approach shown in FIG. 6B, a combined clip/file that includes statically a representation of a cross-fade portion 610 is created and provided to the destination system. Note that the example shown has been simplified by having Clip 1 start at a frame (i.e., lower resolution interval) boundary and Clip 2 end at such a boundary, to set aside other issues.

FIGS. 7A and 7B illustrate an embodiment of representing in a destination system cross-fade and/or other effects created in a source system. In the example shown, the original Clips 1 and 2 have been used to create truncated clips Clip 1' and Clip 2' and intersection clip 702, which latter clip includes the cross-fade and/or other effect. As noted above, the approach shown in FIG. 7B enables the original media files underlying Clips 1 and 2 (or at least relevant additional potentially desirable portions thereof) to be provided to the destination system, with the overlapping portions associated with the cross-fade or other effect being provided in a separate file underlying clip 702. In this way, the original files (or additional portions thereof) are available at the destination system for further editing and/or other manipulation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of representing high-resolution media content in a lower resolution system, comprising:
   creating for a first portion of a high-resolution media content which is associated with a content boundary that does not align with an interval boundary of the lower resolution system a new media content file that includes at least said first portion of the high-resolution media content; and
   providing to the lower resolution system the new media content file and a second file comprising at least a second portion of the original media content file, which second portion begins at a first interval boundary and ends at a second interval boundary of the lower resolution system;
   wherein the high-resolution media content comprises a first high-resolution media content and the new media content file further comprises at least a portion of a second high-resolution media content; and
   wherein the new media content file further comprises a null content positioned between the respective portions of the first high-resolution media content and second high-resolution media content such that the first portion begins at a start boundary aligned with a first interval boundary of the lower resolution system and the second portion ends at an end boundary aligned with a second interval boundary of the lower resolution system.

2. The method of claim 1, wherein the second file comprises the original media content file.

3. The method of claim 1, wherein the second file includes in addition to the second portion one or both of a first handle portion preceding the second portion and a second handle portion following the second portion.

4. The method of claim 3, wherein at least one of the following is true: the first handle portion begins at a first interval boundary of the lower resolution system, and the second handle portion ends at a second interval boundary of the lower resolution system.

5. The method of claim 1, wherein the null content is of a duration required to align one or both of a start boundary and an end boundary of a media content clip associated with the new media content file to be aligned with said interval boundary of the lower resolution system.

6. The method of claim 1, wherein the respective portions of the first high-resolution media content and second high-resolution media content are included within the same set of one or more intervals of the lower resolution system.

7. The method of claim 1, further comprising receiving an indication that the high-resolution media content associated with an original media content file is to be represented in the lower resolution system.

8. The method of claim 1, further comprising determining a resolution of the lower resolution system.

9. The method of claim 1, further comprising creating a description of how to use the new media content file and the second file to represent the high-resolution media content in the lower resolution system.

10. The method of claim 9, further comprising providing the description to the lower resolution system.

11. The method of claim 1, wherein the high-resolution media content comprises or is otherwise associated with a clip as defined and arranged in a higher resolution system.

12. The method of claim 1, wherein the new file includes a cross-fade or other effect applied to the high-resolution media content in a higher resolution system.

13. A system for representing high-resolution media content in a lower resolution system, comprising:
a processor configured to:
create for a first portion of a high-resolution media content which is associated with a content boundary that does not align with an interval boundary of the lower resolution system a new media content file that includes at least said first portion of the high-resolution media content; and
provide to the lower resolution system the new media content file and a second file comprising at least a second portion of the original media content file, which second portion begins at a first interval boundary and ends at a second interval boundary of the lower resolution system; and
a storage coupled to the processor and configured to store the high-resolution media content;
wherein the high-resolution media content comprises a first high-resolution media content and the new media content file further comprises at least a portion of a second high-resolution media content; and
wherein the new media content file further comprises a null content positioned between the respective portions of the first high-resolution media content and second high-resolution media content such that the first portion begins at a start boundary aligned with a first interval boundary of the lower resolution system and the second portion ends at an end boundary aligned with a second interval boundary of the lower resolution system.

14. The system of claim 13, wherein the second file comprises the original media content file.

15. The system of claim 13, wherein the second file includes in addition to the second portion one or both of a first handle portion preceding the second portion and a second handle portion following the second portion.

16. The system of claim 13, wherein the null content is of a duration required to align one or both of a start boundary and an end boundary of a media content clip associated with the new media content file to be aligned with said interval boundary of the lower resolution system.

17. The system of claim 13, wherein the processor is further configured to create a description of how to use the new media content file and the second file to represent the high-resolution media content in the lower resolution system.

18. A computer program product for representing high-resolution media content in a lower resolution system, the computer program product being embodied in a non-transitory computer readable medium and comprising computer instructions for:
creating for a first portion of a high-resolution media content which is associated with a content boundary that does not align with an interval boundary of the lower resolution system a new media content file that includes at least said first portion of the high-resolution media content; and
providing to the lower resolution system the new media content file and a second file comprising at least a second portion of the original media content file, which second portion begins at a first interval boundary and ends at a second interval boundary of the lower resolution system;
wherein the high-resolution media content comprises a first high-resolution media content and the new media content file further comprises at least a portion of a second high-resolution media content; and
wherein the new media content file further comprises a null content positioned between the respective portions of the first high-resolution media content and second high-resolution media content such that the first portion begins at a start boundary aligned with a first interval boundary of the lower resolution system and the second portion ends at an end boundary aligned with a second interval boundary of the lower resolution system.

19. The computer program product of claim 18, wherein the second file comprises the original media content file.

20. The computer program product of claim 18, wherein the second file includes in addition to the second portion one or both of a first handle portion preceding the second portion and a second handle portion following the second portion.

* * * * *